(12) United States Patent
Barr et al.

(10) Patent No.: US 11,279,080 B2
(45) Date of Patent: Mar. 22, 2022

(54) ADDITIVE MANUFACTURING METHOD AND ASSEMBLY

(71) Applicant: HONEYWELL FEDERAL MANUFACTURING & TECHNOLOGIES, LLC, Kansas City, MO (US)

(72) Inventors: Christian G. Barr, Kansas City, MO (US); George W. Bohnert, Harrisonville, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 26 days.

(21) Appl. No.: 16/705,363

(22) Filed: Dec. 6, 2019

(65) Prior Publication Data

US 2021/0170670 A1    Jun. 10, 2021

(51) Int. Cl.
| | |
|---|---|
| *B29C 64/118* | (2017.01) |
| *B29C 64/209* | (2017.01) |
| *B29C 64/227* | (2017.01) |
| *B29C 64/188* | (2017.01) |
| *B29C 64/25* | (2017.01) |
| *B33Y 10/00* | (2015.01) |
| *B33Y 30/00* | (2015.01) |

(52) U.S. Cl.
CPC .......... *B29C 64/118* (2017.08); *B29C 64/188* (2017.08); *B29C 64/209* (2017.08); *B29C 64/227* (2017.08); *B29C 64/25* (2017.08); *B33Y 10/00* (2014.12); *B33Y 30/00* (2014.12)

(58) Field of Classification Search
CPC ... B29C 64/118; B29C 64/188; B29C 64/209; B29C 64/227; B29C 64/25; B33Y 10/00; B33Y 30/00
See application file for complete search history.

(56) References Cited

U.S. PATENT DOCUMENTS

| | | |
|---|---|---|
| 9,796,140 B2 | 10/2017 | Page |
| 2014/0232035 A1 | 8/2014 | Bheda |
| 2016/0193785 A1 | 7/2016 | Bell et al. |
| 2016/0214321 A1 | 7/2016 | Tow et al. |

(Continued)

*Primary Examiner* — Joseph S Del Sole
*Assistant Examiner* — Manley L Cummins, IV
(74) *Attorney, Agent, or Firm* — Hovey Williams LLP (57) ABSTRACT

Methods and assemblies for additive manufacturing portions of components with enhanced strength are provided. The assemblies comprise a first deposition head and an apparatus for causing one or more reinforcement fibers to extend more than two layers within previously-deposited layers of build material. The first deposition head is configured to deposit a plurality of layers of a filament comprising a reinforcement fiber and thermoplastic material. The apparatus may comprise a needle point configured to be inserted into the plurality of layers to displace the reinforcement fiber so that it extends two or more of the plurality of layers. The apparatus may additionally or alternatively comprise a second deposition head having a needle tip configured to be inserted into the plurality of layers to inject a length of a second filament comprising thermoplastic material and a reinforcement fiber so that the reinforcement fiber of the second filament extends two or more layers of the plurality of layers of the first filament.

20 Claims, 4 Drawing Sheets

(56) References Cited

U.S. PATENT DOCUMENTS

2017/0052531 A1    2/2017  Minardi et al.
2017/0157851 A1*  6/2017  Nardiello .............. B29C 48/266
2017/0173868 A1    6/2017  Mark
2017/0182712 A1*  6/2017  Scribner ................ B29C 64/336
2017/0259502 A1*  9/2017  Chapiro ................. B33Y 10/00

* cited by examiner

ID MANUFACTURING METHOD
ADDITIVE MANUFACTURING METHOD AND ASSEMBLY

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Carbon fibers are often added to matrix materials, such as nylon or epoxy, to enhance the strength of the materials. Carbon fibers are typically thin, exceptionally strong in the axial direction, and add little weight to the matrix materials. Carbon fibers may be encapsulated by resin and shaped to form a part. Carbon fibers may also be deposited between layers of printed build material to strengthen parts manufactured using three-dimensional printers. The strands of carbon fiber increase the lateral strength of the part along the direction the build material was deposited. However, parts formed in this manner do not experience improved axial strength in directions that are not parallel to the direction the thermoplastic material was deposited.

The background discussion is intended to provide information related to the present invention which is not necessarily prior art.

SUMMARY

The present invention solves the above-described problems and other problems by providing a distinct advance in the art of carbon fibers used in additive manufacturing. More particularly, the present invention provides methods of and assemblies for additive manufacturing that enable placement of reinforcement fibers at multiple angles to enhance part strength in multiple axial directions.

An embodiment of the invention includes a method of additive manufacturing a portion of a component. The method comprises depositing via a fused-deposition manufacturing (FDM) deposition head a plurality of layers of a filament to form the portion of the component. The filament comprises thermoplastic material and a reinforcement fiber. The method further comprises inserting an end of an apparatus into the plurality of layers to displace the reinforcement fiber positioned within one of the plurality of layers so that the reinforcement fiber has a displaced portion that extends two or more layers of the plurality of layers. By displacing the reinforcement fiber in this way, the strength of the additive manufactured portion is enhanced along multiple axial directions.

A method of additive manufacturing a portion of a component according to another embodiment of the present invention comprises depositing via a first FDM deposition head a plurality of layers of a first filament to form the portion of the component. The first filament comprises thermoplastic material and a reinforcement fiber. The method further comprises inserting a needle tip of a second FDM deposition head into the plurality of layers; and depositing via the needle tip of the second FDM deposition head a length of a second filament comprising thermoplastic material and a reinforcement fiber so that the length extends two or more layers of the plurality of layers.

Another embodiment of the invention is an additive manufacturing assembly comprising a first FDM deposition head and a needle point. The first FDM deposition head is configured to deposit a plurality of layers of a filament comprising a reinforcement fiber and thermoplastic material. The needle point is configured to be inserted into the plurality of layers to displace the reinforcement fiber so that it extends two or more layers of the plurality of layers.

Another embodiment of the invention is an additive manufacturing assembly comprising a first FDM deposition head and a second FDM deposition head. The first FDM deposition head is configured to deposit a plurality of layers of a first filament. The first filament comprises a reinforcement fiber and thermoplastic material.

The second FDM deposition head has a needle tip configured to be inserted into the plurality of layers to inject a length of a second filament. The second filament comprises thermoplastic material and a reinforcement fiber. The length of the second filament is injected into the plurality of layers so that the reinforcement fiber of the second filament extends two or more layers of the plurality of layers of the first filament.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
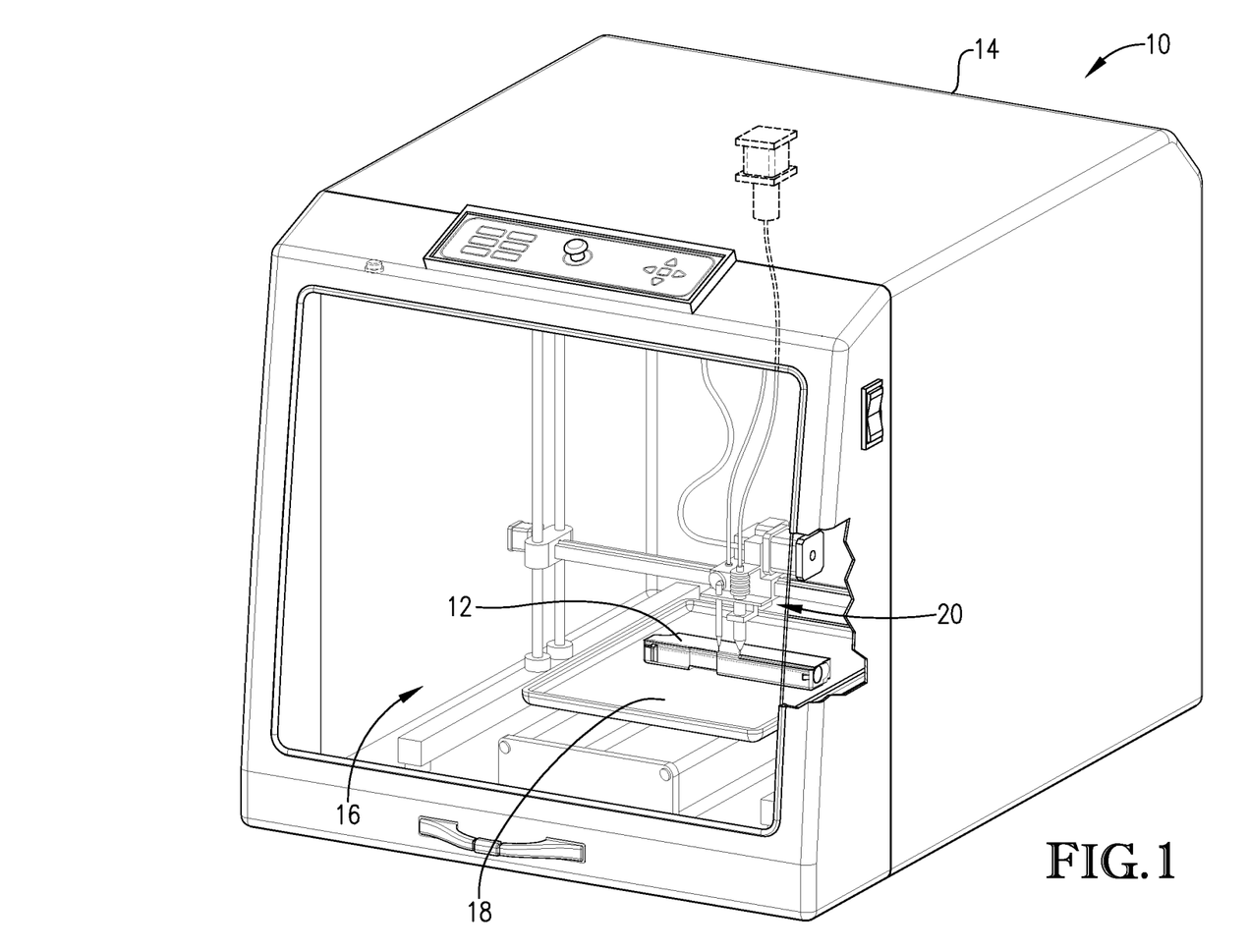
FIG. 1 is a perspective view of an exemplary additive manufacturing system which may implement aspects of the present invention.

Turning to FIG. 1, an exemplary additive manufacturing system 10 which may implement aspects of the present invention is shown. The additive manufacturing system 10 is configured to manufacture at least a portion of a three-dimensional (3D) component 12 such as a high-strength, fiber-reinforced polymer structural part. An embodiment of the system 10 broadly comprises a housing 14 having an inner chamber 16, a build platform 18 positioned in the chamber 16, and an additive manufacturing assembly 20 positioned above the build platform 18. The system 10 may be a 3D printer, a welding machine, a VAT photopolymerization system, a powder bed fusion system, a binder jetting system, a material jetting system, or the like.

The housing 14 protects the components of the system 10 during manufacturing and maintains a suitable environment about the build platform 18. The housing 14 encloses the component 12, the build platform 18, and the assembly 20 in its chamber 16. The build platform 18 supports the component 12 as the component 12 is being manufactured. The platform 18 may be secured beneath the assembly 20 and/or be moveable relative to the assembly 20.

Figure 2:
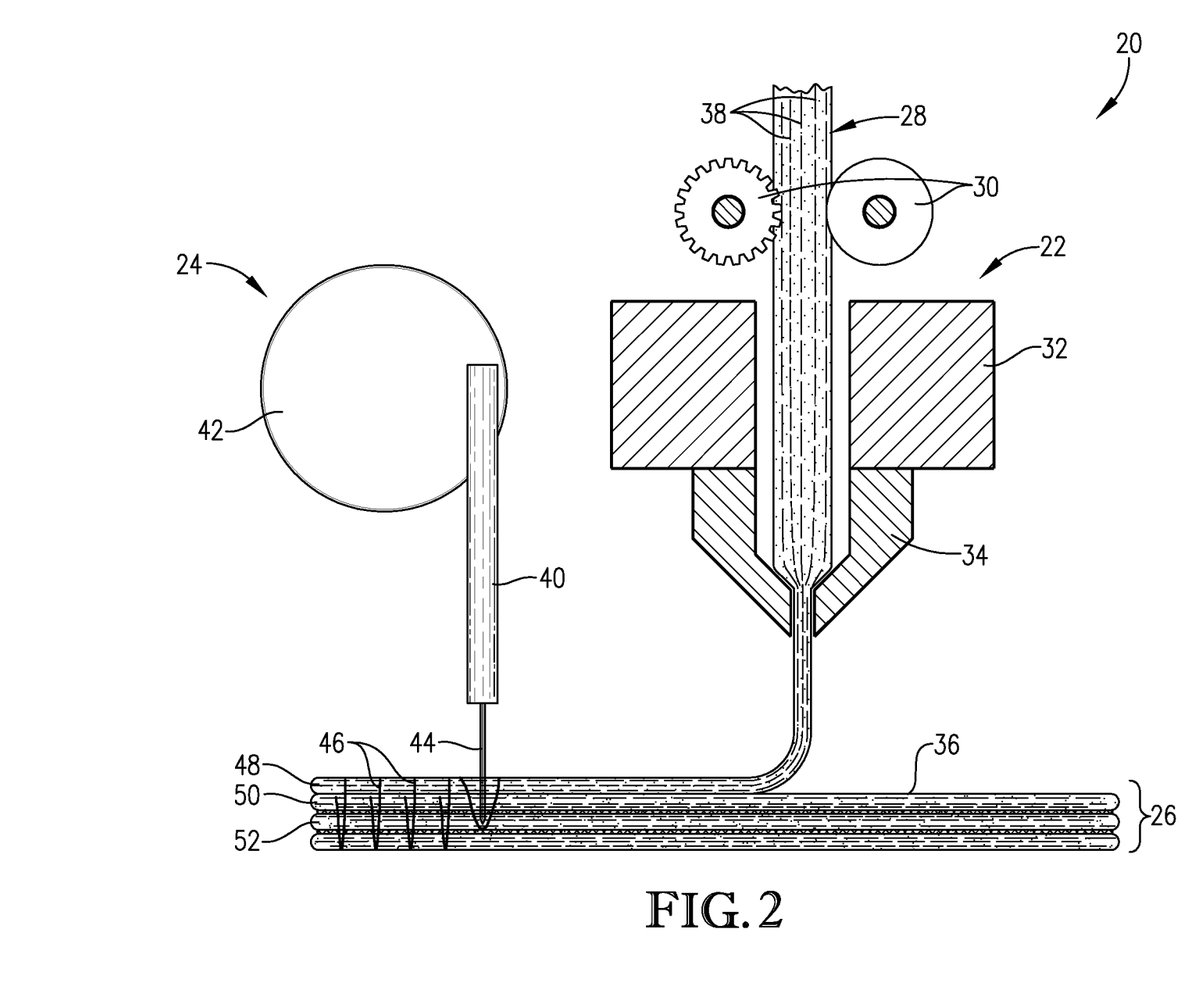
FIG. 2 is a perspective view of an assembly that may be used in the system of FIG. 1 and that is constructed in accordance with an embodiment of the present invention.

Turning to FIG. 2, an embodiment of the additive manufacturing assembly 20 is depicted. The assembly 20 is moveable above the build platform 18 and is operable to deposit build material onto the platform 18 to form at least a portion of the component 12. The assembly 20 comprises a fused-deposition manufacturing (FDM) deposition head 22 and a needle apparatus 24.

The deposition head 22 deposits a plurality of layers 26 of filament 28 onto the platform 18 and/or onto a layer of filament that was previously deposited. The deposition head 22 may comprise an extruder 30, a heater block 32, and a nozzle 34. The extruder 30 forces the filament 28 through the deposition head 22. The heater block 32 heats a portion of the filament 28 as it is forced through the deposition head 22 to the nozzle 34. The heated portion of the filament 28 is then forced out the nozzle 34 to a desired location, such as the build platform 18 and/or onto a layer of filament 28 that was previously deposited.

The filament 28 is used to form the portion of the component 12 and may comprise a matrix material 36 and one or more reinforcement fibers 38. The matrix material 36 may comprise thermoplastic material. The reinforcement fibers 38 may comprise carbon fiber, glass fiber, basalt fiber, ceramic fiber, metal fiber, aramid fiber, polyester fibers, natural fibers, metallized versions of the aforementioned fibers, or the like. The reinforcement fibers 38 may be at least partially coaxial with the filament 28 so that fibers 38 in the plurality of layers 26 are parallel with the layers 26. While FIG. 2 depicts filament 28 having a plurality of fibers 38 in each of the layers 26, the filament 28 may have only one fiber 38 per layer 26.

The needle apparatus 24 is operable to cause one or more of the fibers 38 in the plurality of layers 26 to extend one or more layers 26, and in preferred embodiments, at least three of the layers 26. The needle apparatus 24 may comprise a heated needle 40 and a needle driver 42. The needle 40 has a barb point 44 small enough to be inserted into the layers 26 to physically displace one or more of the fibers 38 therein so that the displaced fibers 46 extend into at least three of the layers 26. The driver 42 is configured to cause the needle 40 to reciprocate vertically into the layers 26 and out of the layers 26 as the needle apparatus 24 moves above the platform 18. The driver 42 may be operated by mechanical means, such as gears and an electric motor or the like, a solenoid-actuator, a pneumatic actuator, or the like. By causing the fibers 38 to extend beyond just two of the layers 26, the vertical axial strength of the portion of the component 12 is greatly enhanced and requires fewer passes of the needle apparatus 24 over the layers 26.

In use, the deposition head 22 deposits a plurality of layers 26 onto the build platform 18, onto a previously-deposited layer, and/or onto a pre-existing part. As the deposition head 22 moves above the layers 26, the needle apparatus 24 is inserted into the plurality of layers 26 to push a portion of one of the fibers 38 of the filament 28 to form the displaced fiber. The heated needle 44 of the needle apparatus 24 displaces the displaced fiber 46 so that the displaced fiber 46 has a portion that extends from its original layer 48 to at least two layers 50, 52 below the original layer 48. The needle 44 may be driven by the needle drive 42 so that it is inserted substantially orthogonally to the layers 26. However, the needle 44 may be inserted at different angles relative to the layers 26 without departing from the scope of the present invention.

Figure 3:
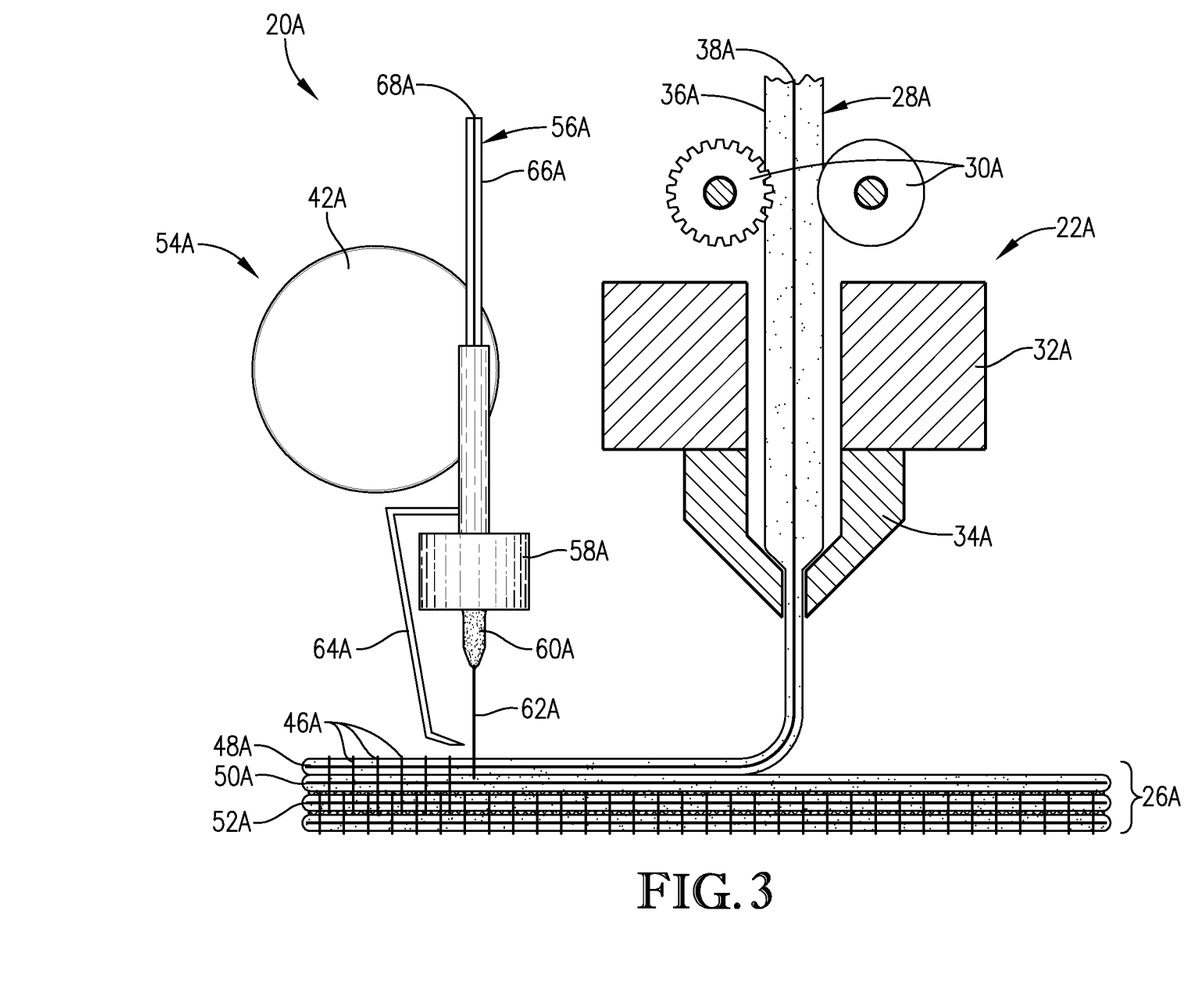
FIG. 3 is a perspective view of an assembly that may be used in the system of FIG. 1 and that is constructed in accordance with another embodiment of the present invention.

An additive manufacturing assembly 20A constructed in accordance with another embodiment of the invention is depicted in FIG. 3. The assembly 20A may comprise substantially similar components as assembly 20; thus, the components of assembly 20A that correspond to similar components of assembly 20 have an 'A' appended to their reference numerals.

The assembly 20A includes all the features of assembly 20 except that the first filament 28A is preferably a continuous strand of fiber and instead of a needle apparatus 24, assembly 20A comprises a second FDM deposition head 54A.

The second deposition head 54A is operable to inject lengths 46A of a second filament 56A into the plurality of layers 26A. The second deposition head 54A may be configured to inject the lengths 46A of the second filament 56A so that the lengths 46A extend at least three of the layers 26A. The second deposition head 54A may comprise an extruder (not shown), a needle driver 42A, a heater block 58A, a nozzle 60A, a heated needle 62A, and a cutting device 64A. The extruder forces the filament 56A through the second deposition head 54A. The needle driver 42A is operable to cause the needle 62A to reciprocate vertically into the layers 26A and out of the layers 26A as the second deposition head 54A moves above the platform 18A. The heater block 58A heats a portion of the filament 56A as it is forced through the second deposition head 54A. The heated portion of the filament 56A is then forced out the nozzle 60A to the heated needle 62A. The needle 62A is a syringe-like needle having a bore for injecting the filament 56A into the layers 26A and/or displacing fiber 38A of the layers 48A, 50A, 52A. For example, the needle 62A may be configured to displace the fiber 38A in the layer 48A so that a portion of the fiber 38A extends between two or more of the layers 48A, 50A, 52A, similar to barb point 44 of needle 40. The cutting device 64A is configured to cut the length 46A of the filament 56A off from the rest of the filament 56A below the needle 62A after the length 46A of the filament 56A has been injected into the layers 26A.

The filament 56A is used to form the lengths 46A that are injected into the layers 26A and may comprise a matrix material 66A and one or more reinforcement fiber 68A. The matrix material 66A may comprise thermoplastic material. The reinforcement fiber 68A may comprise carbon fiber, glass fiber, basalt fiber, ceramic fiber, metal fiber, aramid fiber, polyester fibers, natural fibers, metallized versions of the aforementioned fibers, or the like. The reinforcement fiber 68A may be at least partially coaxial with the filament 56A so that the fiber 68A is parallel with the needle 62A as it is forced therethrough. While FIG. 3 depicts filament 56A having one fiber 68A, the filament 56A may have any number of fibers 68A without departing from the scope of the present invention.

In use, the deposition head 22A deposits a plurality of layers 26A onto the build platform 18, onto a previously-deposited layer, and/or a pre-existing part. As the deposition head 22A moves above the layers 26A, the second deposition head 54A is inserted into the plurality of layers 26A to inject lengths 46A of the second filament 56A into the plurality of layers 26A. The lengths 46A may extend from a top layer 48A to at least two layers 50A, 52A below the top layer 48A. Once the driver 42A has driven the heated needle 62A into the layers 26A, the extruder pushes the filament 56A through the second deposition head 54A the driver 42A simultaneously lifts the needle 62A so that the length 46A remains in the layers 26A. The length 46A may be injected substantially orthogonally to the layers 26A. However, the needle 62A may be inserted at alternative angles without departing from the scope of the present invention. Additionally or alternatively, the needle 62A may be used to displace portions of the fiber 38A in the layers 48A, 50A, 52A so that portions of the fiber 38A extend between two or more of the layers 48A, 50A, 52A. Once the length 46A has been injected, the cutting device 64A may cut the filament 56A at the top of the length 46A thereby depositing the length 46A in the layers 26A. Alternatively, the lengths 46A may be deposited into a plurality of layers 26A that are not at the top. Additionally, the lengths 46A may be cut prior to extrusion through the needle 62A.

Figure 4:
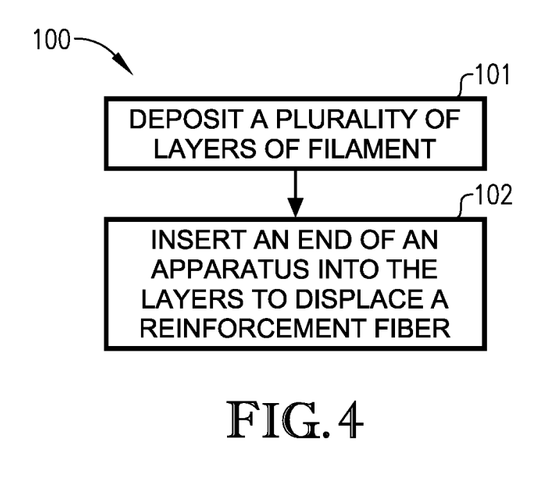
FIG. 4 is a flowchart illustrating a method of additive manufacturing a portion of a component according to an embodiment of the present invention.

The flow chart of FIG. 4 depicts the steps of an exemplary method 100 of additive manufacturing a portion of the component 12. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1 and 2. For example, the steps of the method 100 may be performed by the deposition assemblies 20, 20A through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, a plurality of layers 26 of filament 28 are deposited via the FDM deposition head 22 to form the portion of the component 12. The filament 28 may comprise the matrix material 36, such as thermoplastic, and one or more reinforcement fiber 38. The reinforcement fibers 38 may be coaxial with the filament 28 and comprise carbon fiber.

Referring to step 102, an end 44 of an apparatus 24 may be inserted into the layers 26 to displace at least one of the fibers 38 to result in a displaced fiber 46. The end 44 of the apparatus 24 may be the point of the needle 40. The needle 40 may be driven into the layers 26 via the needle driver 42 and removed via the driver 42. The driver 42 may insert the needle 40 at an angle normal to the layers 26 and/or at different angles relative to the layers 26. The needle 40 may be inserted so that the displaced fiber 46 has a portion that extends from a first layer 48 to at least two layers 50, 52 below the first layer 48.

The method 100 may include additional, less, or alternate steps and/or device(s), including those discussed elsewhere herein. For example, the method 100 may be repeated multiple times for each layer of filament 28 deposited on top of the layers 26. Additionally, the method 100 may include injecting lengths 46A of the second filament 56A into the layers 26 via the second deposition head 22A.

Figure 5:
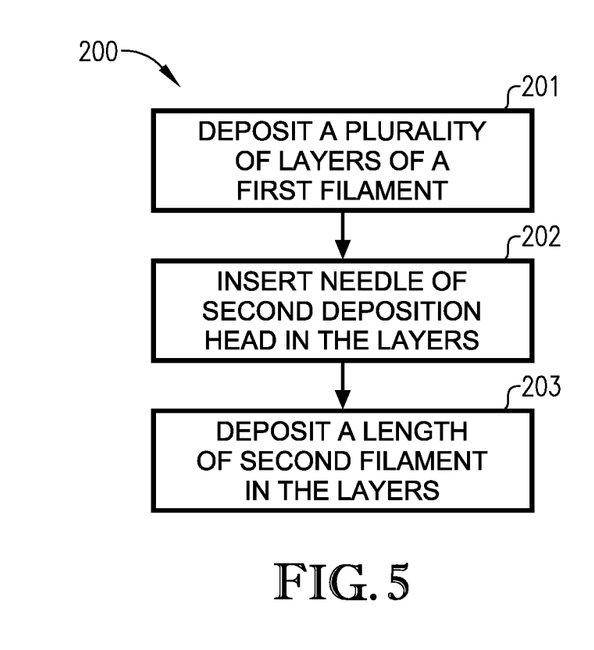
FIG. 5 is a flowchart illustrating a method of additive manufacturing a portion of a component according to another embodiment of the present invention.

The flow chart of FIG. 5 depicts the steps of another exemplary method 200 of additive manufacturing a portion of the component 12. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved. In addition, some steps may be optional.

The method 200 is described below, for ease of reference, as being executed by exemplary devices and components introduced with the embodiments illustrated in FIGS. 1 and 2. For example, the steps of the method 200 may be performed by the deposition assemblies 20, 20A through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 201, a plurality of layers 26A of filament 28A are deposited via the first FDM deposition head 22A to form the portion of the component. The filament 28A may comprise the matrix material 36A, such as thermoplastic, and a reinforcement fiber 38A. The reinforcement fiber 38A may be coaxial with the filament 28A and comprise carbon fiber.

Referring to step 202, a needle 62A of a second deposition head 54A may be inserted into the layers 26A. The needle 62A may be driven into the layers 26A via the needle driver 42A. The driver 42 may insert the needle 62A at an angle normal to the layers 26 and/or at different angles relative to the layers 26A. The needle 62A may be inserted into at least the three topmost layers 48, 50, 52 of the plurality of layers 26.

Referring to step 203, the length 46A of the second filament 56A may be deposited in the layers 26A via the needle 62A of the second deposition head 54A. The second filament 56A comprises the matrix material 66A, which may comprise thermoplastic, and the reinforcement fiber 68A, which may comprise carbon fiber. The reinforcement fiber 68A may comprise a continuous fiber that is coaxial with the second filament 56A. The length 46A may be deposited so that it extends into the next layer or preferably between at least three layers 48A, 50A, 52A. The three layers 48A, 50A, 52A may be the top three layers. This step 203 may include removing the needle 62A via the driver 42 while the extruder simultaneously pushes the second filament 56A through the second deposition head 54A so that the length 46A replaces the hole formed by the needle 62A. Additionally, the length 46A may be cut from the second filament 56A via the cutting device 64A.

The method 200 may include additional, less, or alternate steps and/or device(s), including those discussed elsewhere herein. For example, the method 200 may be repeated multiple times for each layer of filament 28A applied on top of the layers 26A. Additionally, the method 200 may include displacing lengths of the fiber 38A in the layers 26A via the needle apparatus 24 and/or second deposition head 54A.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of additive manufacturing a portion of a component, the method comprising:
   depositing via a fused-deposition manufacturing deposition head a plurality of layers of a filament to form the portion of the component, the filament comprising thermoplastic material and a reinforcement fiber; and
   inserting an end of an apparatus into the plurality of layers to displace the reinforcement fiber in the plurality of layers so that the reinforcement fiber has a portion that extends to two or more layers of the plurality of layers.

2. The method of claim 1, wherein the reinforcing fiber comprises at least one of carbon fiber, glass fiber, basalt fiber, ceramic fiber, metal fiber, aramid fiber, polyester fibers, natural fibers, or metallized fibers.

3. The method of claim 1, wherein
   the apparatus comprises at least one of a mechanical actuator, a solenoid actuator, or a pneumatic actuator; and
   the end is at least one of a syringe needle or barb point.

4. The method of claim 1, wherein the reinforcing fiber is coaxial with a length of the filament.

5. The method of claim 1, wherein the filament comprises a plurality of reinforcing fibers, one or more of the plurality of reinforcing fibers being coaxially disposed in the thermoplastic material.

6. A method of additive manufacturing a portion of a component, the method comprising:
   depositing via a first fused-deposition manufacturing deposition head a plurality of layers of a first filament to form the portion of the component, the first filament comprising thermoplastic material and a reinforcement fiber;
   inserting a heated needle tip of a second fused-deposition manufacturing deposition head into the plurality of layers so that the heated needle tip extends into at least two or more layers of the plurality of layers so that the heated needle tip extends into at least two or more layers of the plurality of layers; and
   depositing via the needle tip of the second fused-deposition manufacturing deposition head a length of a second filament comprising thermoplastic material and a reinforcement fiber so that the length extends two or more layers of the plurality of layers.

7. The method of claim 6, further comprising cutting via a cutting device the reinforcement fiber of the second filament.

8. The method of claim 6, wherein the reinforcement fiber of the first filament and the reinforcement fiber of the second filament are continuous strands of fiber.

9. The method of claim 6, wherein the reinforcement fiber of the second filament is coaxial with a length of the second filament.

10. The method of claim 6, wherein the reinforcement fiber of the first filament is coaxial with a length of the first filament.

11. The method of claim 6, wherein the reinforcement fiber of the first filament and the reinforcement fiber of the second filament comprise at least one of carbon fiber, glass fiber, basalt fiber, ceramic fiber, metal fiber, aramid fiber, polyester fibers, natural fibers, or metallized fibers.

12. A method of additive manufacturing a portion of a component, the method comprising:
    depositing via a fused-deposition manufacturing deposition head a plurality of layers of a filament comprising thermoplastic material and a reinforcement fiber; and
    inserting a needle point into the plurality of layers to displace the reinforcement fiber in the plurality of layers so that the reinforcement fiber extends into at least two layers below a top layer of the plurality of layers.

13. The method of claim 12, wherein at least a portion of the reinforcement fiber is coaxial with the filament during the depositing step.

14. The method of claim 12, wherein the filament comprises a plurality of reinforcement fibers.

15. The method of claim 12, wherein the reinforcement fiber comprises at least one of carbon fiber, glass fiber, basalt fiber, ceramic fiber, metal fiber, aramid fiber, polyester fibers, natural fibers, or metallized fibers.

16. The method of claim 12, wherein the depositing step comprises extruding the thermoplastic material.

17. The method of claim 12, wherein the fiber of the filament comprises a continuous fiber.

18. The method of claim 12, wherein the depositing step comprises heating the filament.

19. The method of claim 12, wherein the inserting step comprises inserting the needle point substantially orthogonally to a surface of the plurality of layers of the filament.

20. The method of claim 12, further comprising heating the needle point.